US008497778B1

(12) United States Patent
Martin

(10) Patent No.: US 8,497,778 B1
(45) Date of Patent: Jul. 30, 2013

(54) FISHING LINE MONITORING APPARATUS

(76) Inventor: Jesse M. Martin, Shawano, WI (US)

(*) Notice: Subject to any disclaimer, the term of this patent is extended or adjusted under 35 U.S.C. 154(b) by 318 days.

(21) Appl. No.: 13/046,139

(22) Filed: Mar. 11, 2011

(51) Int. Cl.
G08B 23/00 (2006.01)

(52) U.S. Cl.
USPC .................................. 340/573.1; 242/223

(58) Field of Classification Search
USPC .................. 340/573.1; 242/223, 224, 231
See application file for complete search history.

(56) References Cited

U.S. PATENT DOCUMENTS

| 4,285,154 | A |   | 8/1981 | Grahl |
| 4,373,287 | A |   | 2/1983 | Grahl |
| 4,633,608 | A |   | 1/1987 | Savarino |
| 4,651,460 | A | * | 3/1987 | Sykes ........................... 43/17 |
| 4,928,419 | A |   | 5/1990 | Forrestal |
| 5,097,618 | A |   | 3/1992 | Stoffel |
| 5,152,093 | A |   | 10/1992 | Bartys |
| 5,896,694 | A |   | 4/1999 | Midha |
| 7,008,086 | B1 |   | 3/2006 | Kell |

* cited by examiner

Primary Examiner — Shirley Lu
(74) Attorney, Agent, or Firm — Montgomery Patent & Design; Robert C. Montgomery

(57) ABSTRACT

A fishing line monitoring apparatus includes a base support to adjustably span an ice fishing hole, a tip-up rig frame rotatably mounted to the base support, a visual and an audible alarm, and a radio transmitter assembly. The tip-up rig includes a support arm having a fishing line and reel. The visual and audible alarms provide both visual and audible indication when the fishing line is tugged. The rotating tip-up rig allows the tip-up rig frame and support arm to rotate for simple positioning and use. The transmitter includes a transmitter and a power source. The audible alarm is actuated by contacts located on a support arm and the reel, such that the audible alarm emits a series of audible beeps over when the reel spins, such as from a fish moving on the line. The transmitter transmits the audible beeps over a wireless RF signal to a remote receiver.

11 Claims, 3 Drawing Sheets

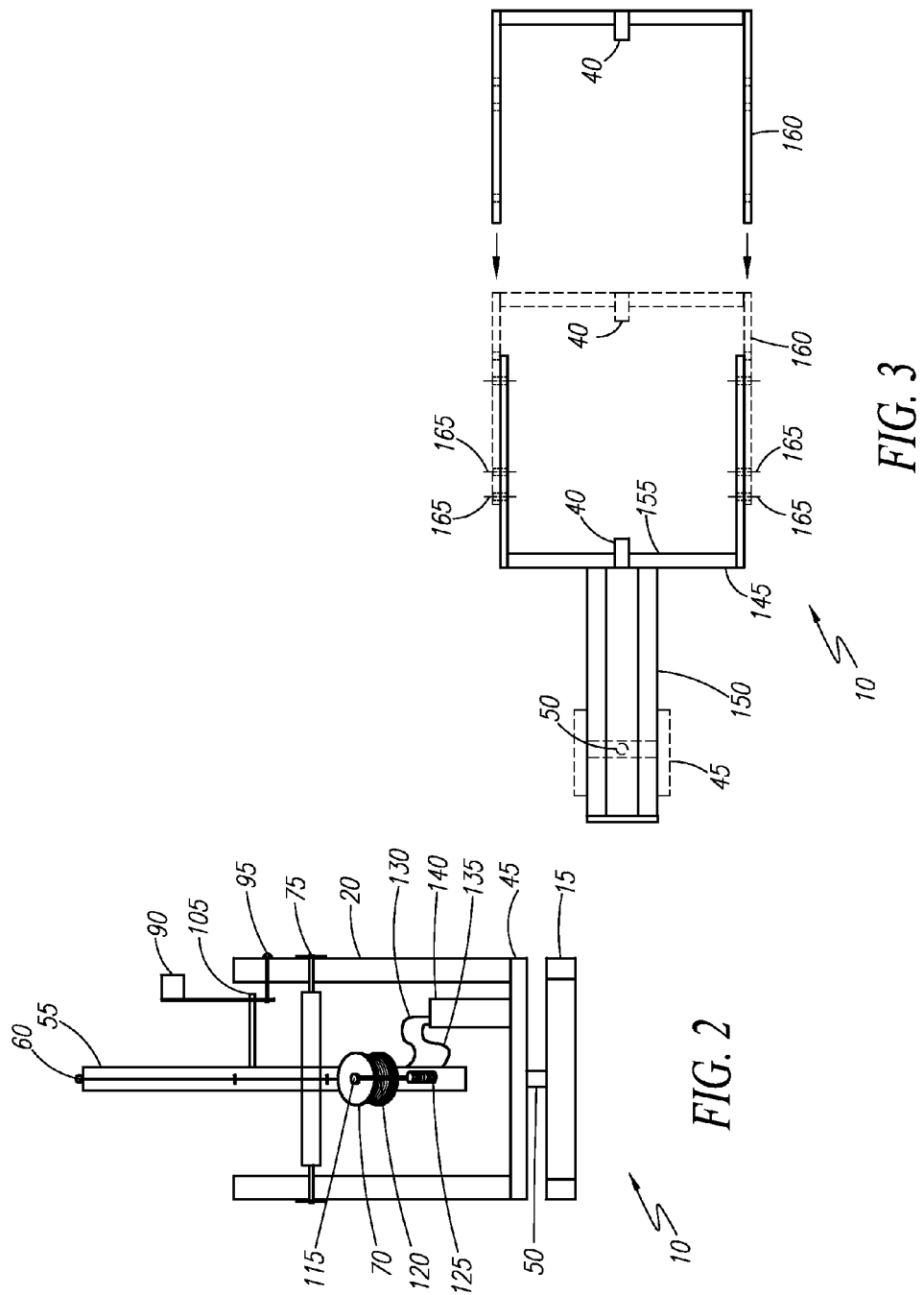

US 8,497,778 B1

FISHING LINE MONITORING APPARATUS

RELATED APPLICATIONS

The present invention was first described in a notarized Official Record of Invention on Dec. 30, 2008, that is on file at the offices of Montgomery Patent and Design, LLC, the entire disclosures of which are incorporated herein by reference.

FIELD OF THE INVENTION

The present invention relates generally to fishing tip-ups, and in particular, to a tip-up rig having a fishing line monitoring apparatus.

BACKGROUND OF THE INVENTION

The use of fishing tip-up rigs during wintertime ice fishing is common. They allow fishermen the ability to fish from many different fishing holes at one (1) time. The tip-up provides for a reel system that properly places the hook at a location where fish will strike it and holds it there for hours while the fisherman attends to other tasks. When a fish should strike the hook, a spring mechanism releases a pop-up flag to indicate the strike. The fisherman can then attend to the rig and simply pull the fish out of the water.

However, while seemingly simple in design, the conventional tip-up is fraught with disadvantages. It is a common occurrence to have the fishing line tangle, snag, break, or otherwise malfunction, allowing the fish to get away. It is also a common occurrence to have the tip of flag activated by windy conditions and not by a fish hitting the line. Also, when the flag is flipped up, the fisherman knows little about the rate of line deployment, or whether or not the line is even still moving. Some tip-up rig manufacturers have addressed this concern by providing an audible alarm which is activated upon a fish strike. While such audible systems provide some additional information, the loud audible shrill is difficult to differentiate from one fishing tip-up rig to the next. Also, the loud noise disturbs the tranquility and peacefulness of fishing for other fisherman who happen to be in the area as well. While these devices may achieve their purported objective each suffers from one or more disadvantage or deficiency related to design or utilization as described.

SUMMARY OF THE INVENTION

The inventor has therefore recognized the aforementioned inherent problems and lack in the art and observed that there is a need for a device where fishing tip-up rigs can be modified to address the aforementioned concerns. In accordance with the invention, it is an object of the present disclosure to solve these problems.

The inventor recognized these problems and has addressed this need by developing a fishing line monitoring system which provides fisherman the ability to catch fish while ice fishing in a manner which is quick, easy, and effective. The inventor has thus realized the advantages and benefits of providing a fishing line monitoring apparatus having an aft frame adapted to sit on an ice surface and a forward frame affixed to said aft frame adapted to span an ice fishing hole. A tip up rig frame is rotatably mounted atop the aft frame and a support arm pivotably coupled to the tip up rig frame having a rear end and an opposing front end. A primary spring is attached between the tip up rig frame and the support arm rear end for biasing the support arm front end in an above horizontal position. A fishing reel is mounted to the support arm rear end by a conductive bearing and a fishing line is releasably wound on the fishing reel and guided to the support arm first end. The fishing line terminates in an attached hook.

A signaling flag is pivotably coupled to the tip up rig frame having a secondary spring attached between the tip up rig frame and the signaling flag for biasing the signaling flag in a generally vertical position. A flag setting mechanism is affixed to the support arm for retaining the signaling flag in the above horizontal position. The fishing line moves the support arm front end downwardly to an at least horizontal position in response to a pulling force on the fishing line, such that the flag setting mechanism releases the signaling flag.

A switch is provided to complete an electrical circuit actuated by rotation of the fishing reel. An audible alarm is in electrical communication with the switch, such that when the fishing reel rotates in response to the pulling force on the fishing line each revolution of the fishing reel momentarily completes the electrical circuit causing a sound from the audible alarm.

A stationary RF transceiver is disposed adjacent to the audible alarm and is in wireless communication with at least one (1) remote RF transceiver. The stationary RF transceiver transmits the sound from the audible alarm to the remote RF transceiver.

Furthermore, the described features and advantages of the disclosure may be combined in various manners and embodiments as one skilled in the relevant art will recognize. The disclosure can be practiced without one (1) or more of the features and advantages described in a particular embodiment.

Further advantages of the present disclosure will become apparent from a consideration of the drawings and ensuing description.

BRIEF DESCRIPTION OF THE DRAWINGS

The advantages and features of the present disclosure will become better understood with reference to the following more detailed description and claims taken in conjunction with the accompanying drawings, in which like elements are identified with like symbols, and in which:

FIG. 2 is a front view of the fishing line monitoring apparatus 10 according to the preferred embodiment;

FIG. 3 is a sectional view of the fishing line monitoring apparatus 10 as seen along a section line I-I of FIG. 1, according to the preferred embodiment; and, FIG. 4 is an electrical block diagram of the major electrical components as used in the fishing line monitoring apparatus 10, according to the preferred embodiment.

DESCRIPTIVE KEY

| | |
|---|---|
| 10 | fishing line monitoring apparatus |
| 15 | base support frame |
| 20 | tip-up rig frame |
| 25 | ice |
| 30 | body of water |
| 35 | hole |
| 40 | alignment peg |
| 45 | rotatable frame |
| 50 | rotating bearing |

| | |
|---|---|
| 55 | support arm |
| 60 | fishing line |
| 65 | support eyelets |
| 70 | fishing line reel |
| 75 | first fulcrum |
| 80 | primary spring |
| 85 | fish |
| 90 | signaling flag |
| 95 | second fulcrum |
| 100 | secondary spring |
| 105 | flag setting mechanism |
| 110 | protective sleeve |
| 115 | electrically-conductive bearing |
| 120 | contact arm |
| 125 | contact spring |
| 130 | first conductor |
| 135 | second conductor |
| 140 | transmitter/enunciator weatherproof enclosure |
| 145 | forward frame |
| 150 | aft frame |
| 155 | fixed frame |
| 160 | movable frame |
| 165 | fasteners |
| 170 | battery |
| 175 | audible alarm |
| 180 | portable self-contained transceiver |
| 185 | sliding transmit lock switch |
| 190 | stability plate |

DETAILED DESCRIPTION OF THE PREFERRED EMBODIMENT

In accordance with the invention, the best mode is presented in terms of a preferred embodiment, herein depicted within FIGS. 1 through 4. However, the disclosure is not limited to a single described embodiment and a person skilled in the art will appreciate that many other embodiments are possible without deviating from the basic concept of the disclosure and that any such work around will also fall under its scope. It is envisioned that other styles and configurations can be easily incorporated into the teachings of the present disclosure, and only one particular configuration may be shown and described for purposes of clarity and disclosure and not by way of limitation of scope.

The terms "a" and "an" herein do not denote a limitation of quantity, but rather denote the presence of at least one of the referenced items.

Figure 1:
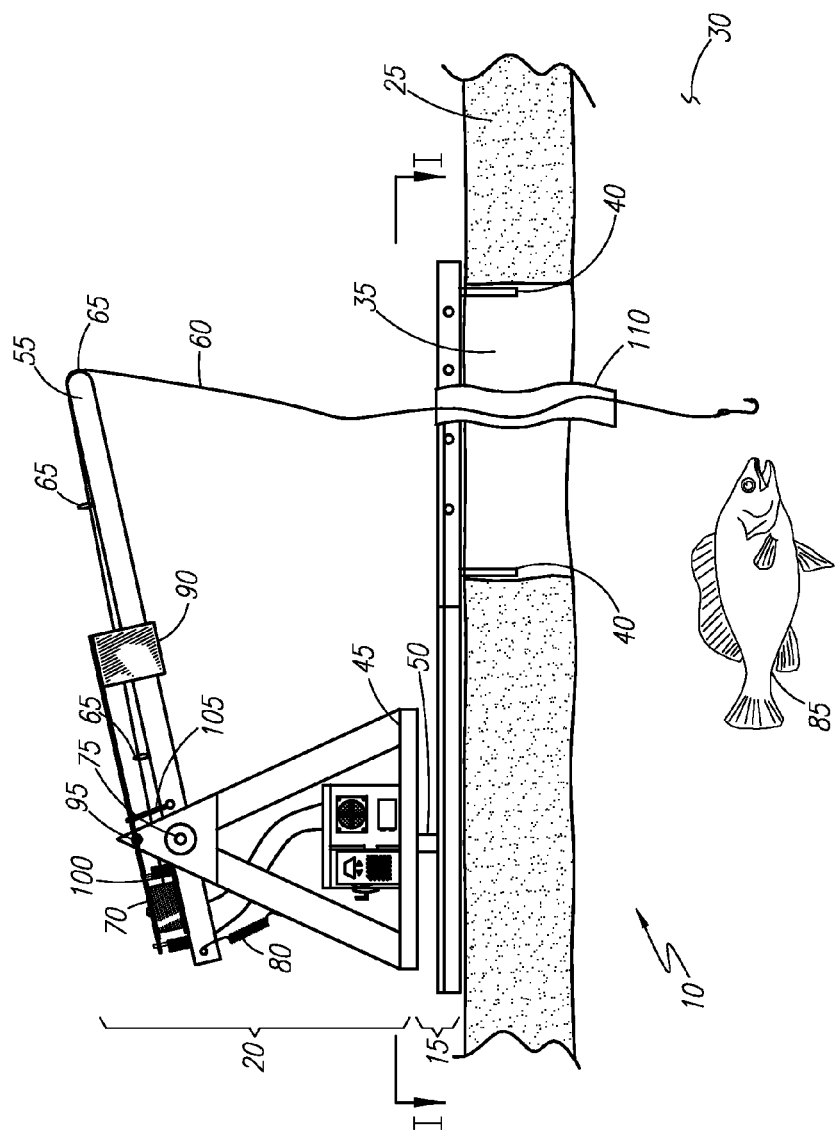
FIG. 1 is a side view of a fishing line monitoring apparatus 10, according to a preferred embodiment in accordance with the invention.

FIG. 1 shows a front view of the fishing line monitoring apparatus (herein referred to as an "apparatus") 10. The apparatus 10 includes a base support frame 15 and a tip-up rig frame 20. The base support frame 15 sits upon ice 25 over a body of water 30 as would be expected when ice fishing. The base support frame 15 is positioned such that it straddles a hole 35 in the ice 25 as shown. Two (2) alignment pegs 40 extend downward from the base support frame 15 to aid in positioning of the apparatus 10. The base support frame 15 is adjustable for use on holes 35 that are between eight (8) inches and ten (10) inches as commonly drilled by conventional ice fishing augers. The rearward portion of the base support frame 15 supports a rotatable frame 45 which in turn supports the tip-up rig frame 20 by a rotating bearing 50. The tip-up rig frame 20 is of an "A"-frame design and provides for components that are normally found on a conventional tip-up fishing rig.

A support arm 55 provides support for a fishing line 60 through a series of support eyelets 65. The fishing line 60 is deployed from a fishing line reel 70 located at the rearward portion of the support arm 55. The support arm 55 is supported at a first fulcrum 75. A primary spring 80 provides a counteracting force upon the support arm 55 as the fishing line 60 is pulled upon by a fish 85 in the body of water 30. In a similar manner, a signaling flag 90 is mounted alongside the support arm 55 and is supported by a second fulcrum 95. A secondary spring 100 acts against the signaling flag 90 to hold it down under normal, pre-activated conditions. When a fish 85 should strike the fishing line 60 and pull the support arm 55 downward, a flag setting mechanism 105 disengages from the signaling flag 90 and permits it to rise into a vertical alerting position.

The apparatus 10 is also provided with a protective sleeve 110 that is attached to the base support frame 15 at the upper portion and hangs below the lower surface of the ice 25 at its lower end. The fishing line 60 is routed through the protective sleeve 110 such that it provides protection for the fishing line 60 against any sharp edges of the ice 25 thus eliminating the chances of accidental severing. Additionally, the protective sleeve 110 provides abrasion protection for the fishing line 60 as well thus leading to overall longer life for the fishing line 60 and associated lower costs of periodic replacement.

FIG. 2 shows a side view of the apparatus 10. This figure more clearly shows the arrangement of the tip-up rig frame 20 and how it is supported by the rotatable frame 45 and allowed to turn by the rotating bearing 50 and is held stationary by the base support frame 15. The first fulcrum 75 and the second fulcrum 95 acts as a pivot point for the support arm 55 and the signaling flag 90, respectively. The fishing line 60 is wound upon the fishing line reel 70 in a conventional manner and is supported by an electrically-conductive bearing 115. This electrically-conductive bearing 115 is in physical and electrical contact with a contact arm 120 which makes electrical contact with a contact spring 125 once per revolution of the fishing line reel 70. A first conductor 130 is connected to the electrically-conductive bearing 115 and thus the contact arm 120, while a second conductor 135 is connected to the contact spring 125. The opposing ends of the first conductor 130 and the second conductor 135 will be connected to a transmitter/enunciator weatherproof enclosure 140 located on the rotatable frame 45. It should be noted that the rotatable frame 45 and all components mounted directly to it, turn in relation to the base support frame 15 as provided by the capabilities of the rotating bearing 50 up to ninety degrees (90°) each side. This allows the operating front end of the support arm 55 to be placed above solid ice 25 (as shown in FIG. 1), while fish 85 are removed from the apparatus 10. This is in contrast to the method of removing the entire tip-up rig as is required with conventional rigs.

FIG. 3 shows a sectional view of the apparatus 10 as seen along section line I-I of FIG. 1. The base support frame 15 includes a forward frame 145 and an aft frame 150. The aft frame 150 is adapted for mounting the rotatable frame 45 (shown as hidden line for illustrative purposes) by the rotating bearing 50. The forward frame 145 includes a fixed frame 155 and a movable frame 160 that are secured to each other by a plurality of fasteners 165. The fasteners 165 are of a movable nature to allow the aft frame 150 to be separated entirely from the fixed frame 155 for purposes of conserving space during shipping as well as when the apparatus 10 is stored during off season. It is envisioned that the difference in location of the fasteners 165 will be approximately two (2) inches to allow for the adaptation in the field between holes 35 of eight (8) inches versus those that are ten (10) inches. The fasteners 165 are envisioned to be screws, nuts, or similar fasteners that can be removed or adjusted in a field setting with a minimum use of hand tools. FIG. 3 shows the movable frame 160 in a disconnected state and also in a connected state, via the broken lines, for purposes of clarity of illustration. The alignment pegs 40 are visible from their upper end orientation where they form a stabilizing force with the sides of the hole 35.

Figure 4:
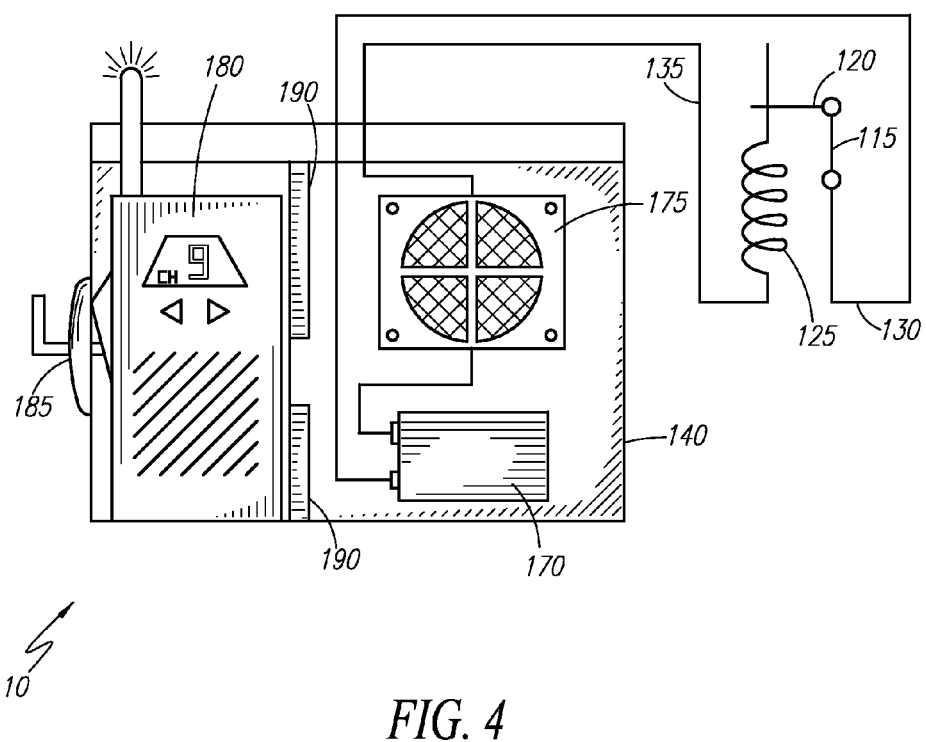

FIG. 4 is an electrical block diagram depicting the major electrical components as used in the apparatus 10. Power for the apparatus 10 is obtained through a battery 170, such as a 9 volt alkaline battery. It is connected electrically to the electrically-conductive bearing 115 and the contact arm 120 by the first conductor 130, where it continues the circuit path through the contact spring 125 and back to the transmitter/enunciator weatherproof enclosure 140 by the second conductor 135. The battery 170 is located in the transmitter/enunciator weatherproof enclosure 140 along with an audible alarm 175, such as a "sonarlert" or equivalent mechanism. Also located in the transmitter/enunciator weatherproof enclosure 140 is a portable self-contained transceiver 180, such as a FRS/GMRS radio or equivalent unit. A sliding transmit lock switch 185 on the side of the transmitter/enunciator weatherproof enclosure 140 provides the ability to physically lock the portable self-contained transceiver 180 in a transmit state. The portable self-contained transceiver 180 is physically held in place against the sliding transmit lock switch 185 using two (2) stability plates 190. In such a manner, the portable self-contained transceiver 180 will allow for the broadcasting of the alert notification made by the audible alarm 175 so that it may be heard a distance away. Another benefit of the current configuration is that the audible alarm 175 will sound only for a short duration of every rotation of the fishing line reel 70. Thus, the more rapid sound frequency, i.e. the less intervals between sounds, the more rapid the fishing line 60 is being deployed. During periods of long cycles between sounds, one can be assured of no or little payout of the fishing line 60. Function, construction, and operation of the portable self-contained transceiver 180 is well understood in the art and beyond the scope of the invention.

In accordance with the invention, it is envisioned that other styles and configurations can be easily incorporated into the teachings of the present disclosure, and only one particular configuration has be shown and described for purposes of clarity and disclosure and not by way of limitation of scope.

The preferred embodiment of the present invention can be utilized by the common user in a simple and effortless manner with little or no training. It is envisioned that the apparatus 10 would be constructed in general accordance with FIG. 1 through FIG. 4.

The user would install an appropriate battery 170 within the transmitter/enunciator weatherproof enclosure 140 and assure the portable self-contained transceiver 180 is in a proper operating mode regarding frequency, volume, range and the like. Next, the fishing line 60 is routed through the support eyelets 65 and the protective sleeve 110 where it is finished with a hook, bait, lure and other suitable fishing aids as is normally used. Once at the fishing location, the apparatus 10 is positioned over the hole 35 such that the alignment pegs 40 engage the sides of the hole 35. The support arm 55 is placed it is final resting position and the signaling flag 90 is pushed downward and held captive with the flag setting mechanism 105. At this point in time, the apparatus 10 is ready for use.

During use of the apparatus 10, the fisherman quietly waits for signal notification tied a matching receiver as used with the portable self-contained transceiver 180 by listening to the corresponding channel. Upon receiving the audible signal as produced by the audible alarm 175, the fisherman would listen to the frequency of the sound segments, or how often they repeat. A quickly repeating sound signal means that the fishing line 60 is being paid out quickly, and that the fisherman should attend to the apparatus 10 as quickly as possible to collect any fish 85. A slowly repeating sound means a slow fish or random movement of the fishing line 60, possibly caused by water currents. In any event, as approaching the apparatus 10, the fisherman would be alerted to the presence of any fish 85 by the audible sound from the audible alarm 175 directly or by the presence of a raised signaling flag 90. The fish 85, if present, would be retrieved and processed in a conventional manner allowing the apparatus 10 to be reset and continue operation in a repeating manner.

The foregoing descriptions of specific embodiments have been presented for purposes of illustration and description. They are not intended to be exhaustive or to limit to the precise forms disclosed and many modifications and variations are possible in light of the above teachings. The embodiments were chosen and described in order to best explain principles and practical application to enable others skilled in the art to best utilize the various embodiments with various modifications as are suited to the particular use contemplated.

What is claimed is:

1. A fishing line monitoring apparatus comprising:
   an aft flame configured to sit on an ice surface;
   a forward frame affixed to said aft frame configured to span an ice fishing hole;
   a tip-up rig frame mounted atop said aft frame;
   a support arm pivotably coupled to said tip-up rig frame having a rear end and an opposing front end;
   a primary spring attached between said tip-up rig frame and said support arm rear end
   for biasing said support arm front end in an above horizontal position; a signaling flag pivotably coupled to said tip-up rig frame;
   a secondary spring attached between said tip-up rig frame and said signaling flag for biasing said signaling flag in a generally vertical position;
   a flag setting mechanism affixed to said support arm for retaining said signaling flag in said above horizontal position;
   a fishing reel mounted to said support arm rear end by a conductive bearing;
   a fishing line releasably wound on said fishing reel and guided to said support arm front end terminating in an attached hook;
   a switch for completing an electrical circuit actuated by rotation of said fishing reel; an audible alarm in electrical communication with said switch;
   a stationary RF transceiver disposed adjacent to said audible alarm in wireless communication with at least one remote RF transceiver; and, a power supply for powering said electrical circuit; wherein said fishing line moves said support arm front end downwardly to an at least horizontal position in response to a pulling force on said fishing line such that said flag setting mechanism releases said signaling flag;
   wherein said fishing reel rotates in response to said pulling force such that each revolution of said fishing reel momentarily completes said electrical circuit causing a sound from said audible alarm; and, wherein said stationary RF transceiver transmits said sound to said at least one remote RF transceiver.

2. The apparatus of claim 1, wherein said switch further comprises:
   a contact arm rigidly attached to said fishing reel and in electrical communication with said conductive bearing; and, a contact spring mounted to said support arm in proximity to said contact arm such that said contact arm momentarily contacts said contact spring once per revolution of said fishing reel.

3. The apparatus of claim 2, further comprising a waterproof enclosure for housing said audible alarm, said stationary RF transceiver, and said power supply.

4. The apparatus of claim 3, wherein said stationary RF receiver further comprises portable handheld transceiver removably secured within said waterproof enclosure;
    wherein said waterproof enclosure further comprises a sliding transmit lock switch for actuating a push-to-talk button on said portable handheld transceiver.

5. The apparatus of claim 4, wherein said aft frame further comprises a rotatable frame rotatably coupled atop said aft frame;
    wherein said tip-up rig frame is mounted to said rotatable frame such that said tip-up rig frame and said support arm are rotatably positioned to side location relative to said ice fishing hole.

6. The apparatus of claim 5, wherein said forward frame further comprises:
    a fixed frame having a first alignment peg protruding downwardly for contacting a perimeter edge of said ice fishing hole; and,
    a movable frame adjustably fastened to said fixed frame having a second alignment peg protruding downwardly for contacting an opposing perimeter edge of said ice fishing hole.

7. The apparatus of claim 6, further comprising a protective sleeve attached between said fixed frame and said movable frame extending at least partially through said ice fishing hole;
    wherein said fishing line is routed completely through said sleeve.

8. The apparatus of claim 7, wherein said support arm further comprises a plurality of support eyelets disposed longitudinally along a top surface to guide and support said fishing line.

9. The apparatus of claim 8, wherein said tip-up rig frame further comprises a generally A shaped frame.

10. The apparatus of claim 1, further comprising a waterproof enclosure for housing said audible alarm, said stationary RF transceiver, and said power supply.

11. The apparatus of claim 10, wherein said stationary RF receiver further comprises portable handheld transceiver removably secured within said waterproof enclosure;
    wherein said waterproof enclosure further comprises a sliding transmit lock switch for actuating a push-to-talk button on said portable handheld transceiver.

* * * * *